United States Patent Office 3,154,000
Patented Oct. 27, 1964

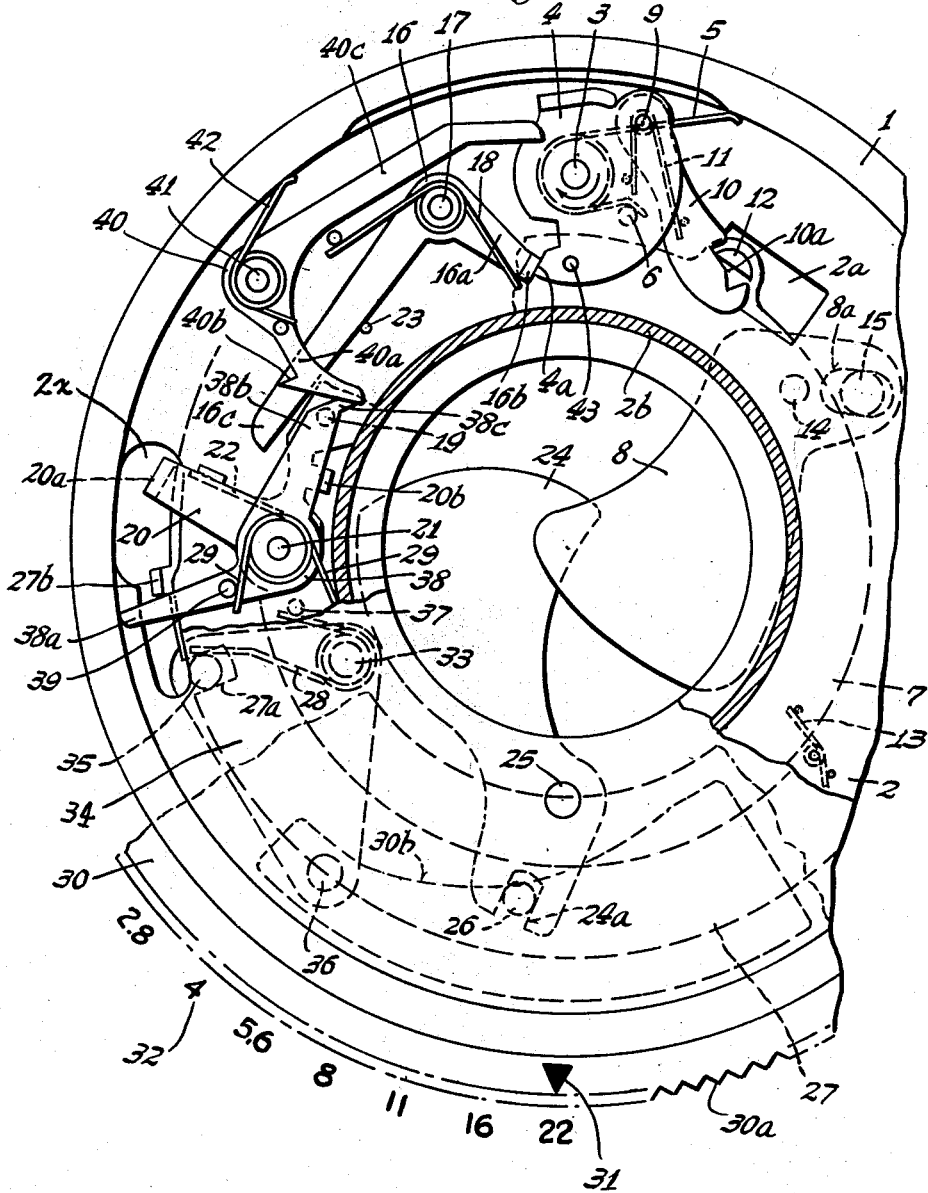

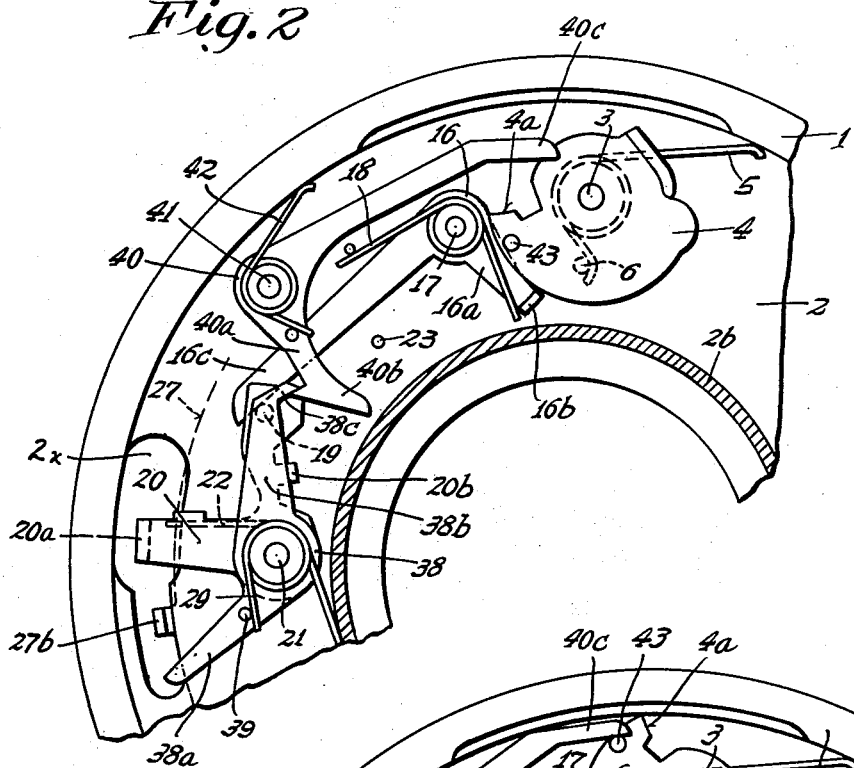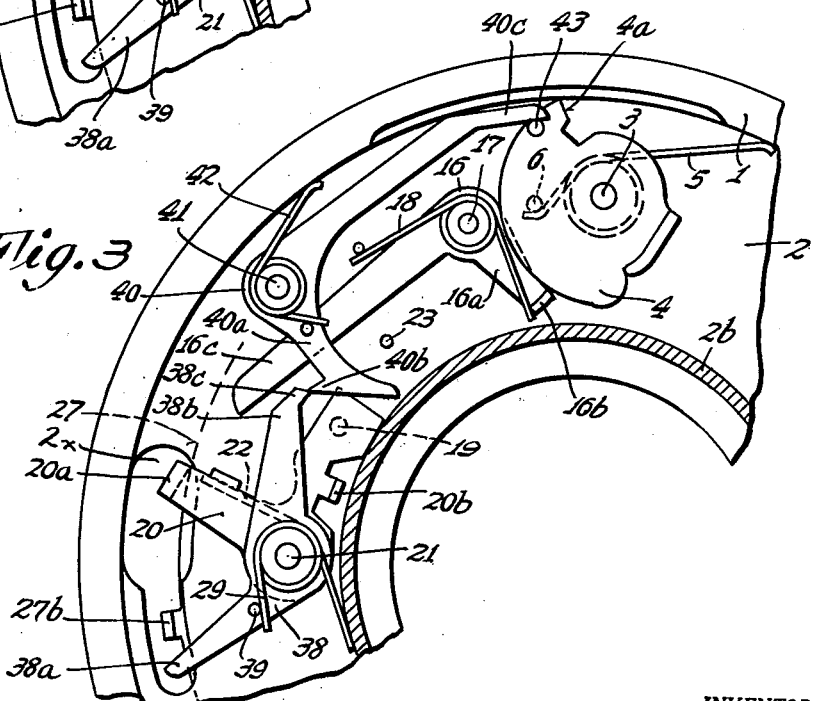

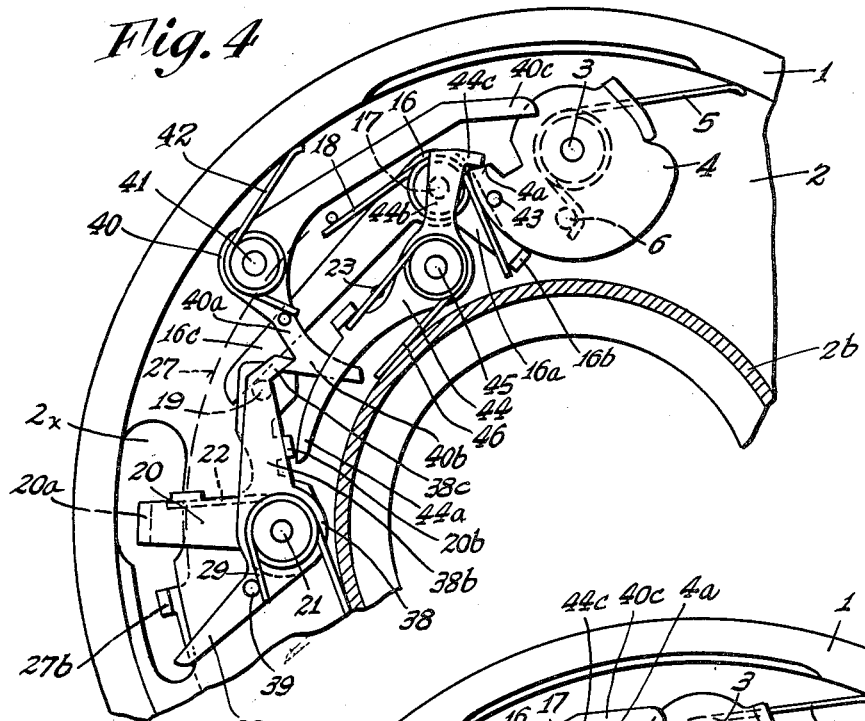
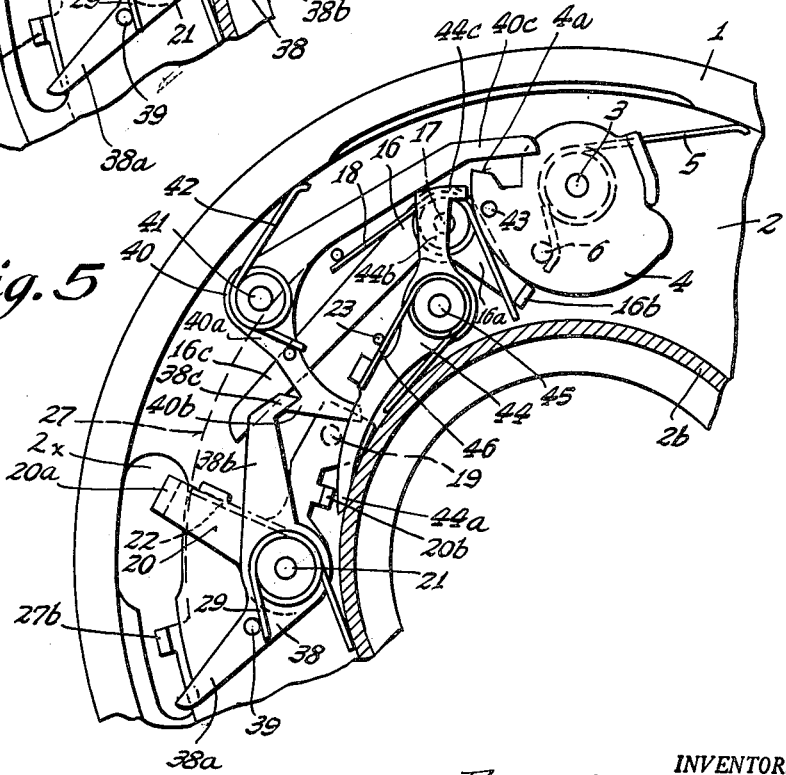

3,154,000
PHOTOGRAPHIC INTRA-LENS SHUTTER CONSTRUCTION HAVING COVER DIAPHRAGM
Franz W. R. Starp, Calmbach (Enz), Germany, assignor to Alfred Gauthier, G.m.b.H., Calmbach (Enz), Germany, a corporation of Germany
Filed June 6, 1961, Ser. No. 115,129
Claims priority, application Germany, June 11, 1960
4 Claims. (Cl. 95—64)

This invention relates to photographic intra-lens shutter constructions wherein, prior to the opening of the shutter and under the action of spring means, a cover diaphragm is opened to a pre-selected diaphragm value in response to actuation of the shutter release member, such cover diaphragm being returned to its closed or covering condition after the shutter has been again closed, under the action of a second spring means which opposes and is stronger than the first mentioned spring means.

In shutter constructions of theabove type, the diaphragm in addition to regulating the light passage or light transmitting opening of the shutter assemblage, also serves the purpose of an additional cover member which supplements the light-blocking action of the normal shutter blades to make more light-tight the light passage at those times that an exposure is not being made. The use of a diaphragm for this purpose makes it possible to dispense with special auxiliary or supplementary cover blades or means, which normally require additional space as well as representing an additional cost due to the added components being required.

In a well known shutter of the above described type, the closing of the diaphragm is effected in response to the return movement of the shutter release member, such closing being effected by the spring return for the shutter or camera release member, which opposes and is stronger than the spring means which effects opening of the diaphragm during the time that the camera or shutter release is being depressed. However, such organization makes it impossible to effect exposures if a delayed action device is to be employed, since the camera or shutter release member is normally let go of immediately after activation of the delayed action device and prior to the opening of the shutter blades. Further, there are certain difficulties and uncertainties involved in effecting time exposures requiring long exposure intervals, with this prior well known arrangement and organization.

The above drawbacks and difficulties are obviated by the present invention, and one object of the invention is to provide a novel and improved photographic intra-lens shutter construction of the general character outlined above but which is so improved that exposures may be effected in an operationally simple and dependable manner, both while employing the delayed action device and also long ("time") exposures as well as B-exposures (bulb), this being effected with a minimum number of parts or components and in an extremely simple and uncomplicated manner. This is accomplished, in accordance with the invention, by an organization which involves the closing spring for the diaphragm mechanism and a movable force-transmitting member on which the said spring acts (as for example a lever or similar pivotal part), the said movable member being cooperably connected with the control or actuating member of the diaphragm mechanism and functioning to retain the same (for the non-operative intervals of the shutter) in a position or condition which corresponds to the closed or covering position of the diaphragm. The said movable member or lever has a portion disposed in the path of movement of the shutter or camera release member which latter, in turn, has a driving lug or catch by means of which it shifts the movable member in response to actuation of the camera release and prior to the release of the cocked shutter drive, against the action of the said spring return, to a position which corresponds to the largest diaphragm aperture. The organization further includes a locking device arranged to retain the said movable member or lever in this diaphragm-opening position until such time that the shutter drive mechanism has run down and the shutter has again reclosed, whereupon the locking device is rendered inoperative by a means which includes a member of the shutter driving mechanism, as for example by the main driving member of the shutter driving mechanism.

The closing of the diaphragm, in a shutter construction made in accordance with the invention, thus takes place independently of the return movement of the shutter release member and is effected completely automatically at such time that the running down movement of the shutter is terminated. This results in the important advantage that it is possible to carry out both B-exposures and exposures involving long exposure intervals, as well as exposures utilizing the delayed action device all in an equally advantageous manner as is the case with well-known intra-lens shutter constructions having normal diaphragms of the non-covering type. A photographic intra-lens shutter construction as thus provided by the invention is distinguished by an unlimited range of application, being adaptable for all kinds of exposures while at the same time insuring a maximum of operational simplicity and dependability.

In a novel construction as provided by the invention, a desirable compactness is had as well as a saving of parts, by arranging the shutter release member and the said movable force-transmitting member or lever so that these are coaxial with respect to each other.

An embodiment of the invention will now be described in the specification which follows, being illustrated in the accompanying drawings wherein:

FIG. 1 is a fragmentary view partly in front elevation and partly in vertical section (on an enlarged scale) of a photographic intra-lens shutter construction as provided by the invention, the front plate of the shutter and the exposure time settting ring being not shown to enable interior details of the assemblage to be revealed. All members of the shutter assemblage which are not essential to the invention have been omitted in the drawing, for the sake of clarity of illustration. The shutter construction is shown with the driving parts in their cocked positions and with the diaphragm closed.

FIG. 2 is a fragmentary view similar in general to that of FIG. 1 but illustrating the parts after the camera or shutter release has been operated and during the running down movement of the shutter drive mechanism.

FIG. 3 is a view similar in general to those of FIGS. 1 and 2, but showing the shutter construction in the full rundown state and immediately prior to return of the diaphragm to its closed or covering position.

FIG. 4 is a view similar to that of FIGS. 1–3 but illustrating further the incorporation of a device for effecting B-exposures. The B-exposure device is in the operative position, retaining the shutter drive mechanism in a position corresponding to the open condition of the shutter blades.

FIG. 5 is a view similar to that of FIG. 4, but showing the position of the parts during the closing movement of the shutter drive mechanism, after the B-device has been restored to the inoperative position by the return movement of the shuttter release member.

Referring now particularly to the figures, the housing of the photographic intra-lens shutter construction is indicated by the numeral 1. Disposed in the shutter housing 1 in a well known manner is a base plate 2 which serves to position usual members of the shutter mechanism. Particularly, the base plate 2 mounts a cocking and driving disk 4 by means of an axis 3, there being a driving spring 5 which at one end engages the side wall of the shutter housing 1 for an anchorage, the other end of the spring 5 engaging a pin 6 affixed to the driving disk.

For the purpose of actuating a driving or operating ring 7 for the shutter blades 8 there is provided a driving link 10 which is pivotally connected to the driving disk 4 by means of a pin 9 (FIG. 1). The link 10 has a notch or recess 10a which receives a pin 12 of semi-circular cross section, carried by the shutter blade operating ring 7, such engagement being maintained by a wire spring 11 carried by the pin or axis 9 and engaging at its ends respectively pins on the link 10 and the driving disk 4. A clearance slot 2a is provided in the shutter base plate 2, through which the semi-circular pin 12 of the blade driving ring 7 extends. Upon a clockwise running down movement of the driving disk 4, in a direction as indicated by the arrow in FIG. 1, the driving ring 7 is actuated with a reciprocating motion whereby the shutter blades 8 are first opened and then reclosed after a predetermined open position has been reached. A light spring 13 acting on the driving ring 7 serves to retain the closed state of the shutter blades 8 during the cocking operation, that is, during the time that the shutter driving mechanism is cocked.

The shutter blades 8, only one of which is shown for reasons of clarity of illustration, are pivotally movable about pins 14 which are carried by the driving ring 7, and in addition have slots 8a receiving fixed pins 15 which are affixed to the shutter base plate 2. The above described shutter blade driving ring and mechanism by which a clockwise running down movement of the driving disk 4 effects opening and closing of the shutter blades 8 is of well known construction and needs no further explanation.

An arresting or detent lever 16 retains the driving disk 4 of the shutter driving mechanism in the cocked position shown in FIG. 1, against the action of the driving spring 5. The arresting lever 16 is carried by a pivot or axis pin 17 affixed to the shutter base plate 2, and is biased in a counterclockwise direction by a wire spring 18. One arm 16a of the arresting lever 16 has a lug or tab 16b which is engageable with a shoulder 4a provided on the shutter driving disk 4 when the latter is in its cocked position as seen in FIG. 1. The remaining arm 16c of the arresting lever 16 is disposed in the path of movement of a pin 19 which is affixed to the release lever 20. The latter is carried by a pivot pin or axis 21 affixed to the shutter base plate 2, being biased in a clockwise direction by a spring 22. The release lever 20 is connected to a camera release member (not shown) by means of an arm 20a which it has and which passes outward through the rear wall of the shutter housing, as made possible by a clearance slot 2x in the shutter base plate and a suitable aligned slot (not shown) in the housing rear wall.

As is apparent from FIG. 1, the arm 16c of the arresting lever 16 engages a fixed pin 23 when the lever is in its operative, detaining position shown, the location of the pin 23 being such that the pin 19 on the shutter release lever 20 is spaced a predetermined distance from the arm 16c. Accordingly, the shutter release lever 20 and the pin 19 may travel through an "idle path" of specified magnitude, representing certain lost motion, prior to engagement occurring between the pin 19 and lever 16. The purpose of this lost motion will be explained below.

Incorporated in the rear portion of the shutter housing 1 is a segment type diaphragm having lamellas, which is settable at different apertures or openings. For the purpose of increasing the light-tightness of the shutter assemblage, the diaphragm is constructed as a cover diaphragm which is opened to a preselected diaphragm value in response to actuation of the shutter release member 20 and prior to the opening of the shutter blades 8, the diaphragm being returned or restored to its closed or covering position only after the shutter blades have again been closed. The diaphragm is constructed in a well known manner, and comprises lamellas or segments 24 only one of which is shown for reasons of clarity of illustration. The lamellas 24 are pivotally movable about fixed pins 25 provided in the rear portion of the shutter housing 1, and have slot-shaped recesses 24a into which extend pins 26 of a diaphragm control or actuating ring 27. A spring 28 to be described below in detail has the effect of tending to open the diaphragm so that it can have a preselected aperture or opening (as determined by a setting member) in response to actuation of the shutter release member 20 and prior to actual opening of the shutter blades. Another spring 29 (also to be described below) is arranged to oppose the action of the spring 28 and is stronger than this latter spring whereby it functions to return the diaphragm to its closed, covering position as shown in FIG. 1 after reclosing of the shutter has been effected.

The pre-selection or setting device for the diaphragm comprises a manually operable adjusting ring 30 which has knurling 30a to facilitate its being turned, such ring being cooperable with a fixed diaphragm scale 32 and having a setting mark 31 for traversing said scale. Co-operation between the adjusting ring 30 and the control or actuating ring 27 of the diaphragm is effected by means of a triangular member 34 which is pivotally movable about a fixed axis or pin 33. The member 34 has a pin-and-slot connection 27a, 35 with the diaphragm control ring 27, the pin 35 which is on the member 34 being engaged by one end of the wire spring 28 whereas the other end of said spring engages a fixed pin 37. The spring 28 thus imparts a counterclockwise bias to the triangular member 34, and the latter has a cam follower pin 36 which is engageable with a cam 30b provided on the adjusting ring 30 (which latter is set with reference to the diaphragm scale 32). The diaphragm opening spring 28 is carried by the fixed pin 33 for the pivotal member 34, as above stated, the pin 35 is affixed to the triangular shaped member 34, whereas the slot 27a is provided in the diaphragm control ring 27.

In accordance with the invention a novel and improved control and adjustment of the movement of the cover diaphragm is provided, which is independent of the return movement of the shutter release member 20 and accordingly is not subject to the disadvantages of prior devices which depend upon this return movement. With such prior devices difficulty is experienced in making time exposures, or B-exposures (bulb), and it is further not possible to make exposures utilizing a delayed action mechanism. These drawbacks are obviated by the present invention, by the provision of an organization wherein the diaphragm is reclosed in response to the running down movement of the shutter drive mechanism, after reclosing of the shutter blades. Further, this is accomplished in a simple manner with but few components or parts, the operation being at all times reliable and foolproof.

Referring to the figures, it is seen that the diaphragm closing spring 29 is utilized to act on a pivotal member or lever 38 which is arranged to be cooperable with the control or actuating ring 27 of the diaphragm. The spring 29 retains the lever 38, for the inoperative or cocked condition of the shutter, in a position which corresponds to the covering or closed position of the diaphragm. The lever 38 has an arm 38b which extends into the path of movement of the shutter release member 20, the latter having a catch or lug 20b arranged for engagement with the lever arm 38b. Thus, when the shutter release member 20 is actuated, the lever 38 is shifted counterclockwise against the action of the spring 29 into a position which corresponds to the largest diaphragm opening or aperture, such shifting occurring prior to release of the shutter drive.

Accordingly, responding to such shifting movement of the lever 38, the diaphragm blades or segments 24 are opened, as will be explained in detail below. The lever 38 is retained in this shifted position by a locking device which is released at the end of the running down movement of the shutter, after the shutter blades have again been fully closed, this being effected by a member of the shutter drive mechanism as will also be explained below.

In the illustrated embodiment of the invention the lever 38 is advantageously carried by the axis or pivot 21 of the shutter release lever 20, thereby effecting a saving of parts. Also, the diaphragm closing spring 29 is disposed about the axis 21, one end of such spring abutting a side of the tubular nozzle or mounting means 2b carried by the shutter base plate 2 whereas the other end of the spring engages a pin 39 affixed to the lever 38. Under the action of the spring 29, one arm 38a of the lever 38 engages, for the inoperative or cocked state of the shutter, a lug 27b carried by the diaphragm control or operating ring 27, thereby retaining the ring (against the biasing influence of the diaphragm opening spring 28) in a position which corresponds to the closed or cover position or condition of the diaphragm. The other arm 38b of the lever 38 engages, as already stated above, the driver lug 20b provided on the shutter release lever 20. Upon actuation of the release lever 20, the lever 38 is thereby shifted against the action of the diaphragm closing spring 29 into a position which is associated with the largest diaphragm aperture. The diaphragm operating ring 27 follows this shifting movement of the lever 38 under the action of the diaphragm opening spring 28 to a point where the pin 36 of the movable member 34 engages the cam 30b of the diaphragm adjusting ring 30. Thus, the diaphragm aperture is adjusted to the pre-set value. This operation occurs and is completed prior to commencement to the opening of the shutter, being accomplished by virtue of the idle path or lost motion (already mentioned above) provided between the pin 19 of the shutter release member 20 and the arm 16c of the arresting lever 16 which retains the shutter driving disk in its cocked condition. During taking up of the lost motion the lever 38 is shifted, upon actuation of the release member 20, fully to the position which is associated with the largest diaphragm aperture and wherein the lever 38 is now retained by means of the locking device shortly to be described.

The said locking device, in the illustrated embodiment of the invention, comprises a lever 40 which is pivotally movable about a pivot pin or axis 41 affixed to the shutter base plate 2. The lever 40 is biased in a clockwise direction by a suitable spring 42, and has one arm 40a provided with an arresting lug or projection 40b arranged to engage under the action of the spring 42 a nose 38c provided on the arm 38b of the lever 38 when the latter is shifted counterclockwise by the shutter release lever 20 as seen in FIG. 4 to the position corresponding to the largest diaphragm aperture. The remaining arm 40c of the lever 40 is disposed in the path of movement of a pin 43 which is affixed to the cocking and driving disk 4 of the shutter. At the end of the running down movement of the driving disk 4 and after the shutter blades 8 have again reclosed the pin 43 engages the arm 40c and pivots the arresting lever 40 in a counterclockwise direction, whereby the locking device is rendered inoperative and the lever 38 is released for clockwise return movement under the action of the diaphragm closing spring 29 to the starting position shown in FIG. 1 associated with the closed or covering condition of the diaphragm.

As mentioned above, a shutter construction as thus provided in accordance with the invention has the important advantage that reclosing or shifting of the diaphragm segments to their covering positions is effected independently of return movement of the shutter release member and takes place only upon termination of running down movement of the shutter drive mechanism. This makes it possible to effect, with such a shutter construction, both delayed action device exposures and also exposures involving long exposure times, as well as B-exposures.

Special emphasis is placed on the fact that no special demands or modifications are needed, as regards the structure and function of the devices for carrying out the above mentioned kinds of exposures, i.e. the B-exposure device, the delayed action device and the mechanism for effecting time exposures. On the contrary, such devices can be constructed in the well known manner, and this is illustrated in FIGS. 4 and 5 where there is shown, by way of example, a device for effecting B-exposures. The B-exposure device comprises an arresting lever 44 which is pivotally mounted by an axis 45 affixed to the shutter base plate 2, being biased in a clockwise direction by a spring 46. Under the action of the spring 46 one arm 44a of the lever 44 engages the driver lug 20b of the shutter release lever 20, whereas the other arm 44b of the lever, which has a lug 44c, is shifted in response to actuation of the release member 20 into the path of movement of the projection 4a of the driving disk 4. Thus the disk 4 is retained, after its initial release, in a position corresponding to the open position of the shutter blades (see FIG. 4). The driving disk 4 is thereafter released at the time that the operator removes pressure from the shutter release member 20, such action returning the arresting lever 44 to the starting position shown in FIG. 5 whereupon the driving disk 4 is able to continue its running down movement by which the shutter blades 8 are reclosed. At the end of such movement (closing the shutter blades 8) the lever 38 is released or shifted under the action of the spring 29 in a clockwise direction, whereby the diaphragm is returned (subsequent to reclosing of the shutter blades) to its closed or covering position even where B-exposures are involved.

The control or actuation of the B-arresting lever 44 is effected in a well known manner by means of the exposure time setting ring of the camera (not shown for reasons of clarity of illustration). This exposure time setting ring has a setting position "B" in which it releases the B-arresting lever 44 to enable the latter to become operative. The B-arresting lever is otherwise retained in its inoperative position, for other settings of the exposure time setting ring which are different from the "B" setting.

The mode of operation of the above described shutter construction is as follows:

*(a) Setting of the Diaphragm*

The setting for a specific diaphragm value is effected in a well known manner, by shifting the manually operable diaphragm adjusting ring 30 so as to bring the setting mark 31 thereof (FIG. 1) opposite or in coincidence with the proper value on the diaphragm scale 32. This shifting of the adjusting ring 30 causes the cam 30b of the setting ring to occupy a specific position with respect to the pin 36 which is affixed to the movable member 34. Thus upon actuation of the shutter release member 20 and counterclockwise turning movement of the lever 38, the resultant shifting of the diaphragm adjusting ring 27 will effect counterclockwise turning movement of the triangular shaped member 34 whereupon the pin 36 thereof will abut and be halted by the cam 30b in a particular or specific position which effects the desired diaphragm aperture.

*(b) Cocking of the Shutter*

This is done in a well known manner by moving the driving disk 4 in a counterclockwise direction from the run down position of FIG. 3, whereby the shutter driving spring 5 is cocked or stressed. At the end of this motion, the lug 16b of the arresting lever 16 will be engaged with the shoulder 4a on the driving disk 4, thereby retaining the latter in cocked position. Such cocked position is illustrated in FIG. 1.

*(c) Releasing the Sutter*

This is done by turning the shutter release lever 20 in a counterclockwise direction as viewed in FIG. 1.

For such motion, the lever 38 is also shifted counterclockwise by means of the driving lug 20b which engages the lever arm 38b. The arm 38a of the lever is thus shifted to a position which corresponds to the largest diaphragm aperture. The diaphragm control or actuating ring 27 follows the movement of the arm 38a under the action of the spring 28, until a point is reached where the pin 36 of the movable triangular shaped member 34 becomes engaged with the set cam 30b of the pre-set diaphragm adjusting member 30. This causes the diaphragm blades to be opened to the desired value, which has been pre-set on the scale 32 by shifting the ring 30 to effect coincidence between the index mark 31 and the desired scale value.

The lever 38 is retained against the action of its spring 29 in its shifted position which corresponds with the largest diaphragm aperture, by means of the locking device comprising the arresting lever 40, as shown in FIG. 2. This insures a retention of the diaphragm in the adjusted open position as determined by the cam 30b. Upon further counterclockwise actuation of the release lever 20, arresting lever 16 is shifted in a clockwise direction whereby the arresting lug 16b thereof moves out of engagement with the shoulder 4a on the driving disk 4. In consequence, the latter is enabled to run down in a clockwise direction as indicated by the arrow in FIG. 1, thereby reciprocating the shutter blade driving ring 7 for opening and closing the shutter blades.

At the end of the closing movement of the shutter blades, the pin 43 on the driving disk 4 impinges on the arm 40c of the arresting lever 40. This causes the latter to pivot in a counterclockwise direction, whereby its arresting lug or projection 40b releases the lever 38. Under the action now of the spring 29, the lever 38 returns to its starting position as shown in FIG. 1, whereby the arm 38a thereof engages the lug 27b of the diaphragm actuating ring 27 so as to return the latter against the action of the diaphragm opening spring 28 to the position corresponding to the closed or covering position of the diaphragm.

It will be readily understood from the foregoing, as explained in the specification and illustrated in the figures, that the invention comprises a novel and improved photographic intra-lens shutter construction which has the special advantage of additional protection against stray light entering through the light passage or light transmitting opening of the shutter as effected by the diaphragm segments while at the same time retaining all of the advantages, features and possibility for use which exist in well known shutters of the type which have no such special protection against stray light.

I claim:
1. In a camera with an intra-lens shutter having a cover diaphragm which in response to the actuation of a shutter release member is opened to a preselected diaphragm value prior to the opening of the shutter and which after the shutter has been closed again is returned to its covering position, the improvement of:
   (a) a two-armed lever pivoted about a fixed axis,
   (b) a control member for effecting movement of the cover diaphragm between open and closed positions,
   (c) said lever having one arm thereof cooperating with said control member for normally maintaining said control member in diaphragm closed position,
   (d) a shutter release for effecting release of the shutter upon the actuation thereof,
   (e) and said other arm of said lever being located in the path of motion of said shutter release whereby said lever is pivoted to effect release of said control member upon the actuation of said shutter release, the release of said control member effecting the opening of said cover diaphragm,
   (f) means for automatically arresting the movement of said control member to a preselected diaphragm value prior to the opening of the shutter,
   (g) means for locking said lever in full open diaphragm position,
   (h) and means for automatically releasing said lever to effect a closing of said cover diaphragm subsequent to the reclosing of the shutter.

2. The invention as defined in claim 1 wherein said means for automatically arresting the movement of said control member to a preselected diaphragm value comprising:
   (a) a setting ring adapted to select a predetermined diaphragm value,
   (b) said setting ring having a cam slot,
   (c) a cam follower operatively associated with said control ring and adapted to be received in said slot for limiting the opening of the diaphragm in accordance with the setting of said setting ring.

3. In a camera with an intra-lens shutter having a cover diaphragm which in response to the actuation of a shutter release member is opened to a preselected diaphragm value prior to the opening of the shutter and which, after the shutter has been closed again, is returned to its covering position, the improvement comprising:
   (a) a diaphragm control means for effecting the movement of said cover diaphragm between open and closed positions,
   (b) a setting means for selecting a predetermined diaphragm value,
   (c) spring means normally biasing said diaphragm control means toward a preselected diaphragm value,
   (d) a lever means including a resilient means operatively associated with said diaphragm control means, said resilient means in the inoperative position of said lever overcoming the bias of said spring means for maintaining said diaphragm control means in a closed diaphragm position,
   (e) a shutter operating means for moving the shutter between an open and closed position,
   (f) shutter drive means for actuating said shutter operating means,
   (g) means for arresting the operation of said shutter drive means until the shutter release member is actuated,
   (h) said lever means being operatively associated with said shutter release member whereby said lever means is actuated upon the release of said shutter release member,
   (i) said arresting means being disposed in the path of said shutter release member so as to be actuated thereby only after said lever means has been permitted the release of said control means to a preselected diaphragm value,
   (j) means for locking said lever means in its shifted position corresponding to the largest diaphragm opening,
   (k) and means on said shutter drive means for rendering inoperative said locking means at the end of the run-down movement of said shutter drive means subsequently to the reclosing of the shutter whereby said resilient means returns said lever and associated control means to closed diaphragm position.

4. In a camera with an intra-lens shutter having a cover diaphragm which in response to the actuation of a shutter release member is opened to a preselected diaphragm value prior to the opening of a shutter and which, after the shutter has been closed again, is returned to its covering position, the improvement of:
   (a) a two-armed lever pivoted about a fixed axis, said lever being cooperatively associated with said shutter release member,
   (b) a control member for effecting the movement of said cover diaphragm between open and closed position,
   (c) said lever in the inoperative position thereof having one arm thereof engaging said control member from maintaining the said control member in closed diaphragm position, and (d) the other arm of said lever being located in the path of motion of said shutter release member whereby actuation of the shutter release member effects pivoting of said lever, (e) a locking lever arranged for retaining said other arm of said lever in a position corresponding to the largest diaphragm opening when said lever is shifted in response to the actuation of said shutter release member, (f) a setting ring for selecting a predetermined diaphragm value, (g) said setting ring having a cam slot, (h) a cam follower, operatively associated with said control ring, adapted to be received in said slot for limiting the opening of said diaphragm in accordance with the setting of said setting ring, (i) means biasing said control ring toward operative position upon actuation of said shutter release member, (j) a shutter operating means including a shutter for moving said shutter between open and closed positions, (k) a shutter drive mechanism for actuating said shutter operating means, (l) means for arresting the operation of said shutter drive mechanism, said arresting means being disposed in the path of movement of said shutter release member, (m) and means including a member of the shutter drive mechanism for rendering inoperative the locking lever at the end of the running down movement of the shutter drive mechanism and subsequent to the consequent reclosing of the shutter whereby said control ring is returned to closed diaphragm position.

References Cited in the file of this patent
UNITED STATES PATENTS

| | | |
|---|---|---|
| 2,935,922 | Rentschler | May 10, 1960 |
| 3,002,441 | Noack et al. | Oct. 3, 1961 |